US006659399B1

(12) United States Patent
Bagnoli et al.

(10) Patent No.: US 6,659,399 B1
(45) Date of Patent: Dec. 9, 2003

(54) COMPACT LINEAR SPLIT SLEEVES FOR ACCURATE RIGGING IN CONFINED SPACE

(75) Inventors: Joseph P. Bagnoli, Remond, WA (US); Neal V. Huynh, Bellevue, WA (US); Gordon Tylosky, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/303,472

(22) Filed: Nov. 25, 2002

(51) Int. Cl.[7] ................................................ B64C 13/30
(52) U.S. Cl. ....................................... 244/75 R; 403/46
(58) Field of Search ................................ 244/213, 214, 244/215, 216, 75 R, 129.1, 131; 403/43–48, 299, 296, 359, 300–313; 411/315, 926

(56) References Cited

U.S. PATENT DOCUMENTS

| | | | | | |
|---|---|---|---|---|---|
| 1,110,201 | A | * | 9/1914 | Hardick | 403/46 |
| 1,265,104 | A | * | 5/1918 | Ogden | 403/46 |
| 3,166,274 | A | * | 1/1965 | Messerschmitt | 244/75 R |
| 3,786,695 | A | * | 1/1974 | Barrett, Jr. | 403/46 |
| 4,657,424 | A | * | 4/1987 | Dong | 403/46 |
| 5,628,477 | A | * | 5/1997 | Cafero et al. | 244/75 R |
| 5,702,196 | A | * | 12/1997 | Petercsak | 403/46 |

* cited by examiner

*Primary Examiner*—Galen L. Barefoot
(74) *Attorney, Agent, or Firm*—Ann K. Galbraith; Artz & Artz, P.C.

(57) ABSTRACT

An aircraft control surface actuator assembly 12 is provided, including a flight control surface 14. A mechanical drive mechanism 18 is in communication with the flight control surface 14. An actuator rod assembly 24 is mounted to the mechanical drive mechanism 18 and includes a first segment 26 having a first segment outer diameter 34 with a plurality of first segment outer threads 36. A second segment 38 has a split sleeve passage 50, a second segment inner diameter 40 with plurality of second segment inner threads 42, and a second segment outer diameter 44 a plurality of second segment outer threads 46. The second segment inner threads 42 engage the first segment outer threads 36. A third segment 52 includes a third segment split sleeve passage 60 as well as a plurality of third segment inner threads 58 engaging the second segment outer threads 46. Rotation of the second segment 38 causes the first segment 26 and third segment 52 to move in opposing lateral directions. Application of a clamping force to the third segment 52 locks the actuator rod assembly 12 and prevents rotation of the second segment 38.

20 Claims, 4 Drawing Sheets

COMPACT LINEAR SPLIT SLEEVES FOR ACCURATE RIGGING IN CONFINED SPACE

TECHNICAL FIELD

The present invention relates generally to an aircraft actuator control assembly and more specifically to an aircraft actuator control rod assembly with linear split sleeves for accurate rigging in confined space.

BACKGROUND OF THE INVENTION

Aircraft mechanical systems commonly incorporate redundancy within their designs to insure proper operation even after the failure of a single component. Numerous systems within the aircraft utilize this methodology in both design and use. One such category of system involves the control of flight control surfaces on aircraft wings. Aircraft control surfaces commonly utilize actuators and actuator control rods to transfer force from drive assemblies, such as hydraulic drives, to the control surface. Many of these surfaces utilize multiple actuators so that if a single actuator fails, the redundant actuators can maintain control of the surface.

Although relatively simplistic in methodology, the application of such multiple actuators can present practical problems during operation if not properly designed and maintained. Improperly aligned or adjusted actuators can result in the actuators force fighting each other during operation. Design requirements commonly necessitate a minimum force fight between multiple actuators operating a flight control surface. These systems commonly require precise performance of the actuation elements and precise rigging of the actuators. Mis-rigging or improper adjustment of these systems can result in inadequate system performance or structural fatigue issues.

Proper rigging and adjustment, however, can prove difficult for many actuator systems located throughout an aircraft. The nature of aircraft design often results in tight packaging environments with limited or poor access to the assemblies. Such is case with aircraft rudder actuators for example. Relatively small access panels or doors in combination with location on the aircraft can make proper adjustment increasingly difficult using conventional methods and assemblies. Often actuators rely on dual jam nuts to effectuate adjustment of the individual actuator assemblies. This requires two wrenches to be inserted into the access panel in order to apply the required torque to the jam nuts. Poor access situations can restrict wrench installation and turning and thereby hamper effective and accurate adjustment of the actuator assemblies. By increasing the difficulty associated with proper rigging, present systems often increase the occurrence of misaligned or misrigged assemblies.

It would, therefore, be highly desirable to have an actuator control assembly with improved rigging accuracy. It would further be highly desirable to have an actuator control rod assembly with adjustment features better suited for accessibility within tight packaging environments or poor access situations.

SUMMARY OF THE INVENTION

It is therefore an object to the present invention to provide an aircraft control surface actuator assembly with improved rigging features. It is further object to the present invention to provide an aircraft control surface actuator rod assembly with rigging features suited for accessibility within tight packaging and access environments.

In accordance with the objects of the present invention an aircraft control surface actuator assembly is provided. The assembly includes a flight control surface. A mechanical drive mechanism is in communication with the flight control surface. The mechanical drive mechanism is driven by an actuator rod assembly including a first segment having a first control mounting end mounted to the mechanical drive mechanism and a first segment adjustment end. The first segment adjustment end includes a first segment outer diameter comprising a plurality of first segment outer threads. The assembly further includes a second segment including a second segment inner diameter having a plurality of second segment inner threads and a second segment outer diameter having a plurality of second segment outer threads. The second segment inner threads engage the first segment outer threads. The second segment further includes at least one second segment split sleeve passage such that the second segment inner diameter can be reduced under a compression force. The actuator rod assembly includes a third segment including a third segment adjustment end and a third segment mounting end. The third section adjustment end includes a third segment inner diameter having a plurality of third segment inner threads engaging the second segment outer threads. The third segment adjustment end further includes at least one third segment split sleeve passage such that the third segment inner diameter can be reduced under the compression force. Wherein the second segment inner threads and the second segment outer threads are orientated such that rotational movement of the second segment moves the first segment and the third segment in opposite linear directions. The third segment includes a clamped sleeve portion comprising a clamp actuator. The clamp actuator applying the compression force to the second segment inner diameter and the third segment inner diameter to prevent rotational movement of the second segment.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
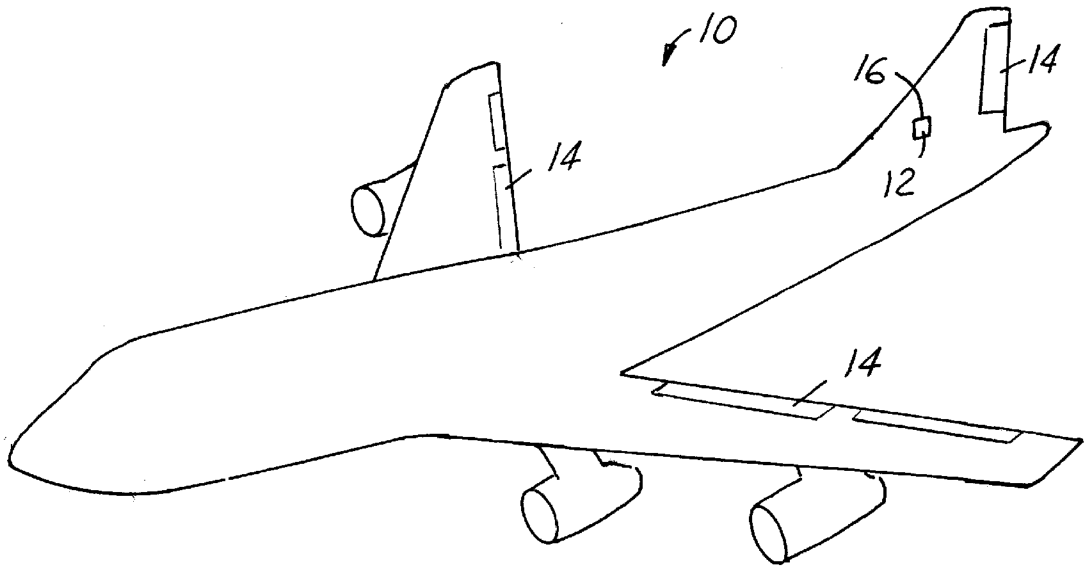
FIG. 1 is an illustration of an aircraft utilizing an aircraft actuator control assembly in accordance with the present invention.

Referring now to FIG. 1, which is an illustration of an aircraft 10 utilizing an aircraft actuator control assembly 12 in accordance with the present invention. The present invention is intended for a wide variety of applications within an aircraft 10 and for implementation into a wide variety of aircraft 10 designs. The present invention is intended for use to control aircraft control surfaces 14. Control surfaces 14 are positioned throughout an aircraft 10 and are utilized to direct airflow and modify the flight path. Although the present invention is intended for use in controlling a wide variety of aircraft control surfaces 14, it is preferably for use with an aircraft rudder.

Figure 2:
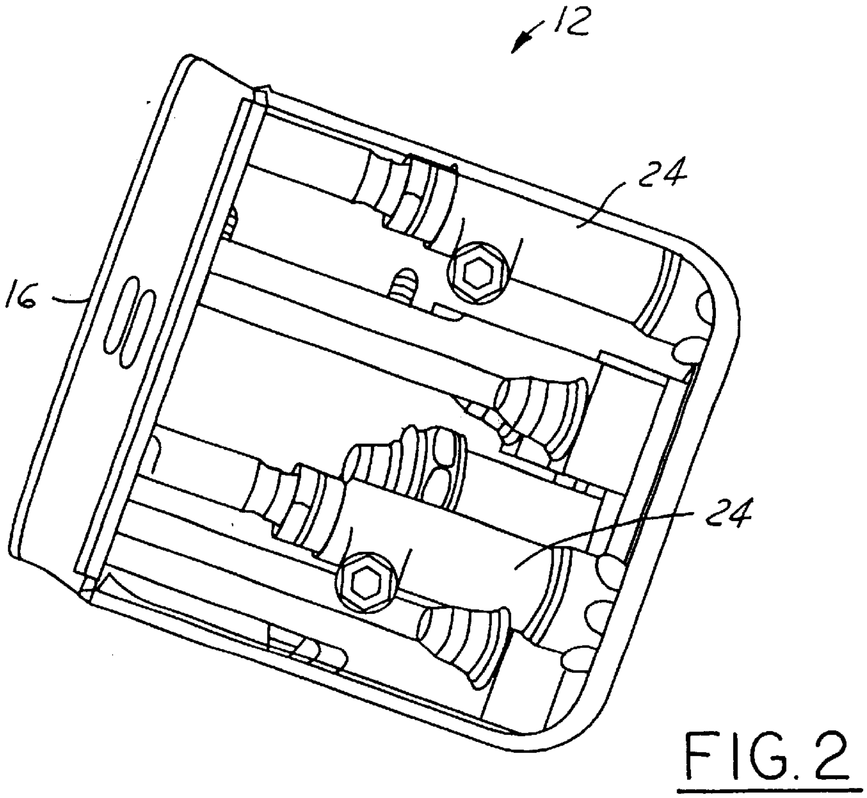
FIG. 2 is an illustration of an access panel housing an aircraft actuator control assembly in accordance with the present invention.
Figure 3:
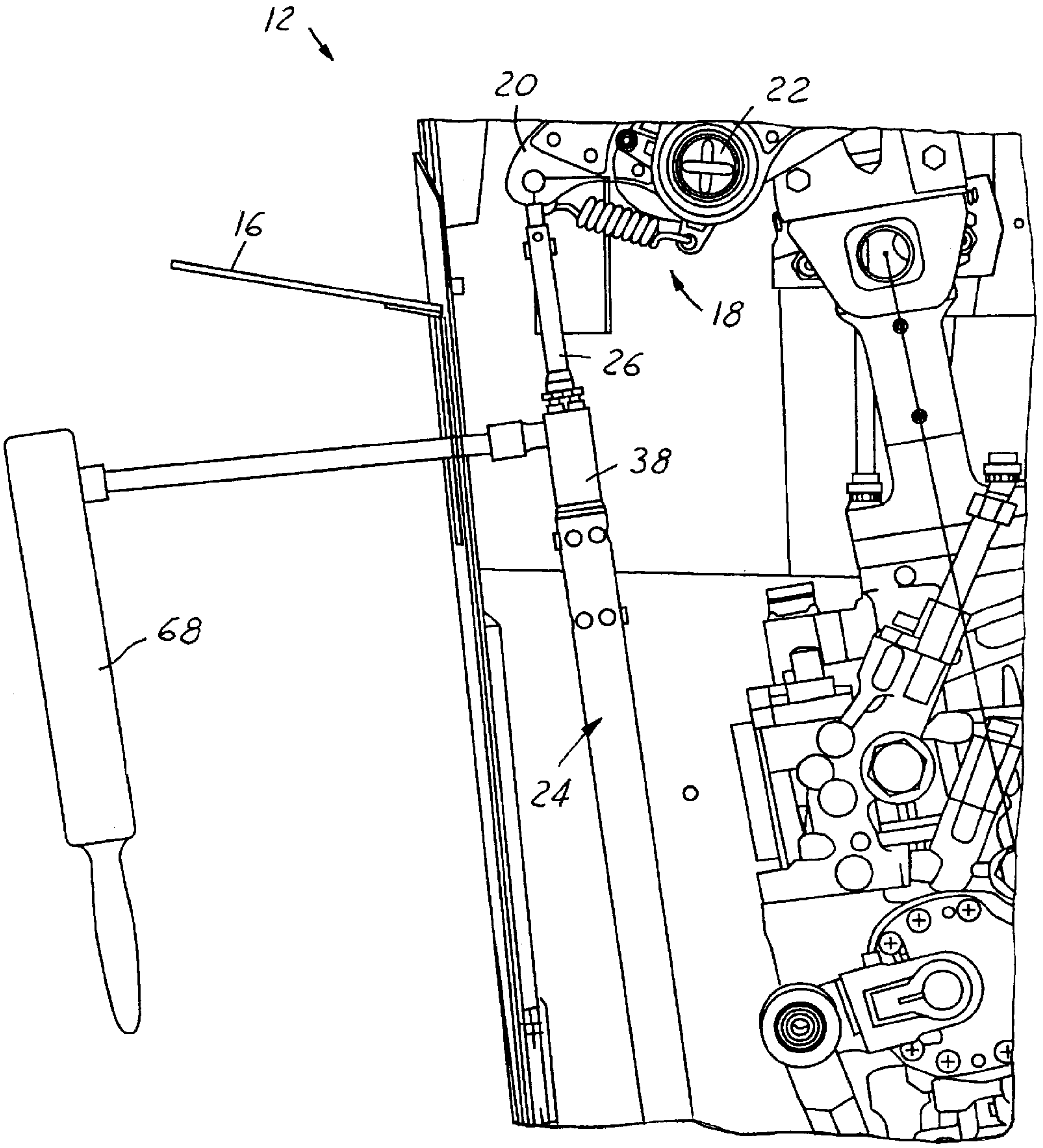
FIG. 3 is internal view illustration of the aircraft actuator assembly illustrated in FIG. 2.

Often, aircraft 10 provide limited access to aircraft actuator control assemblies 12 with which mechanics are required to tune the system. Access such as the access door 16 illustrated in FIG. 2, can present access problems to the components of the aircraft actuator control assembly 12 for mechanics. Traditional designs can cause rigging difficulties and may result in mis-rig situations. The present invention addresses such problems through a unique design illustrated in FIG. 3. The aircraft actuator control assembly 12 includes a mechanical drive mechanism 18 in communication with an aircraft control surface 14. Although a wide variety of mechanical drive mechanisms 18 are known in the airline industry, a single embodiment is illustrated in FIG. 2. The embodiment comprises a mechanical drive lever 20 that effectuates movement of the control surface 14 through rotation about a drive shaft 22.

Figure 4:
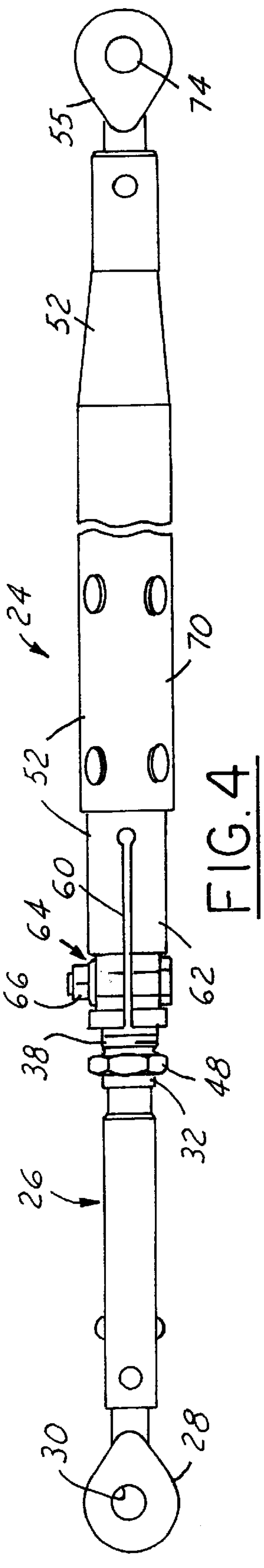
FIG. 4 is detail illustration of the actuator rod assembly illustrated in FIG. 2.
Figure 5:
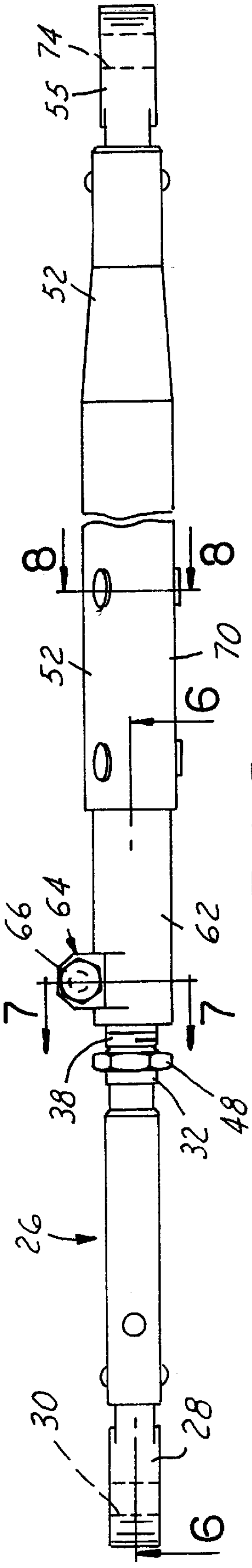
FIG. 5 is a side view illustration of the actuator rod assembly illustrated in FIG. 4.
Figure 6:
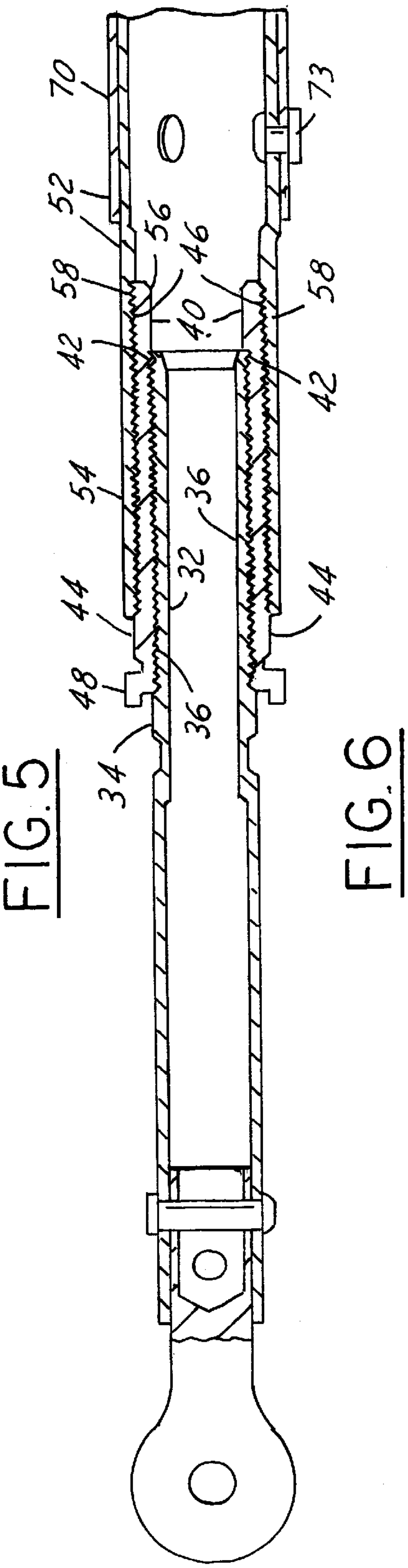
FIG. 6 is a cross-sectional illustration of the actuator rod assembly illustrated in FIG. 5, the cross-section taken along the lines 6—6 in the direction of the arrows.

Motion is imparted to the mechanical drive mechanism 18 from a remote actuator power assembly through the use of one or more actuator rod assemblies 24 (see FIG. 2). Although the use of actuator rod assemblies 24 is known, prior art designs make modification and tuning of the actuator rod assemblies 24 through tight enclosures such as the access door 16 difficult. The present invention addresses this problem through the addition of a unique actuator rod assembly 24. The actuator rod assembly 24, as detailed in FIG. 4, includes a first segment 26 having a first control mounting end 28 attached to the mechanical drive mechanism 18. The first control mounting end 28 may be attached in a variety of fashions. In the illustrated embodiment, it is attached utilizing a bolt passage 30 formed in the first control mounting end 28. The first segment 26 also includes a first segment adjustment end 32 positioned opposite the first control mounting end 28. The first segment adjustment end 32 includes a first segment outer diameter 34 comprising a plurality of first segment outer threads 36. The first segment adjustment end 32 provides an attachment location for a second segment 38.

Figure 7:
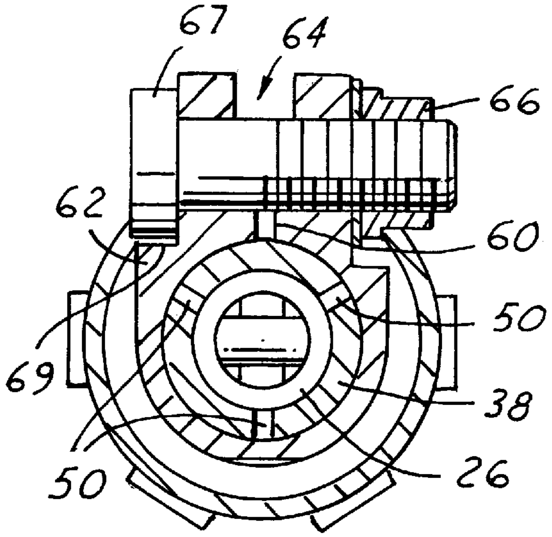
FIG. 7 is a cross-sectional illustration of the actuator rod assembly illustrated in FIG. 5, the cross-section taken along the lines 7—7 in the direction of the arrows.

The second segment 38 includes a second segment inner diameter 40 having a plurality of second segment inner threads 42. It also includes a second segment outer diameter 44 having a plurality of second segment outer threads 46. The second segment inner threads 42 engage the first segment outer threads 36 such that rotation of the second segment 38 imparts relative lateral movement between the first segment 26 and the second segment 38. A polygonal interface 48, preferably hexagonal for interaction with a wrench, is positioned on one end of the second segment 38 to allow the second segment 38, also referred to as a vernier sleeve, to be easily rotated relative to the first segment 26. The second segment 38 further includes at least one second segment split sleeve passage 50 (see FIG. 7). The at least one second segment split sleeve passage 50 allows the second segment inner diameter 40 to be reduced by placing the second segment 38 under a compression force. Although the second segment 38 may be operational with as little as a single second segment split sleeve passage 50 formed along its length, one preferred embodiment contemplates the use of three second segment split sleeve passages 50.

The actuator rod assembly 24 further includes a third segment 52 in communication with the second segment 38. The third segment 52 includes a third segment adjustment end 54 and a third segment mounting end 55. The third segment mounting end 55 is mounted to and driven by any of a variety of actuator power assembles (not shown) well known in the art. One common choice for an actuator power assembly is a hydraulic motor. The third section adjustment end 54 includes a third segment inner diameter 56 having a plurality of third segment inner threads 58 engaging the second segment outer threads 46. Although the second segment outer threads 46 can be formed in a variety of fashions, one embodiment contemplates that the second segment outer threads 46 and the second segment inner threads 42 are orientated such that rotational movement of the second segment 38 moves the first segment 26 and the third segment 52 in opposite linear directions. This allows the length of the actuator rod assembly 24 to be easily lengthened or shortened through the rotation of the second segment 38. It is also contemplated that the differential thread pitch between the second segment outer threads 46 and the second segment inner threads 42 are designed to allow infinitesimal adjustment of the actuator rod assembly 24 to further increase the reliability of any adjustments made.

The third segment adjustment end 54 also includes at least one third segment split sleeve passage 60 such that the third segment inner diameter 56 can be reduced under the compression force. Although the third segment split sleeve passage 60 can be formed in the third segment adjustment end 54 in a variety of fashions, one embodiment contemplates incorporating the third segment split sleeve passage 60 into a clamped sleeve portion 62. The claimped sleeve portion 62 can include a clamp actuator 64. The clamp actuator can be utilized to apply a compressive force to the third segment adjustment end 54 and the second segment 38. The compression force, in turn, is utilized to reduce the second segment inner diameter 40 and the third segment inner diameter 50 to prevent rotational movement of the second segment 38. In this fashion the actuator rod assembly 24 can be locked down after adjustment preventing accidental or unintended alteration of the actuator rod assembly 24 length. The additional advantage of this arrangement is that the clamp actuator 64 can be easily accessed from even small access door 16 situations. Although a variety of clamp actuators 64 are contemplated by the present invention, one embodiment contemplates the use of a nut-clamp assembly 66 facing the access door 16. The bolt portion 67 of the nut-clamp assembly 66 preferably is positioned to contact a flat engagement surface 69 of the clamped sleeve portion 62 in order to prevent rotation of the bolt portion 67 as the nut-clamp assembly 66 is tightened. This allows a socket assembly 68 (see FIG. 3) to be easily inserted through the access door 16 without hampering access to the polygonal interface 48 of the second segment 38.

Figure 8:
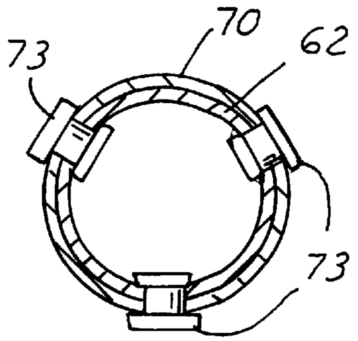
FIG. 8 is a cross-sectional illustration of the actuator rod assembly illustrated in FIG. 5, the cross-section taken along the lines 8—8 in the direction of the arrows.

The third segment 52 can further include a variety of extension rod segments 70 to lengthen the actuator rod assembly 24 such that it can reach the remote actuator power assembly. The extension rod segments 70 can be attached in a variety of fashions, including rivets 73 as illustrated in FIG. 8. The third segment 52 can further include a third segment mounting end 55 for mounting to the power assembly. A third segment bolt passage 74 is only one optional embodiment for such attachment. By reducing the dimensions of the tools necessary to pass through the access door 16 in order to adjust the aircraft actuator control assembly 12, the present invention not only improves the ease of adjustment, but can improve the reliability of such adjustments as well. In this fashion force fight between multiple actuator rod assembles 24 can be reduced.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An aircraft control surface actuator assembly comprising:

a flight control surface;

a mechanical drive mechanism in communication with said flight control surface, said mechanical drive mechanism controlling movement of said flight control surface;

at least one actuator rod assembly mounted to said mechanical drive mechanism, said at least one actuator rod assembly comprising:

a first segment having a first control mounting end mounted to said mechanical drive mechanism and a first segment adjustment end, said first segment adjustment end including a first segment outer diameter comprising a plurality of first segment outer threads;

a second segment including a second segment inner diameter having a plurality of second segment inner threads and a second segment outer diameter having a plurality of second segment outer threads, said second segment inner threads engaging said first segment outer threads;

at least one second segment split sleeve passage formed in said second segment, said at least one second segment split sleeve passage allowing said second segment inner diameter to be reduced under a compression force;

a third segment including a third segment adjustment end and a third segment mounting end, said third section adjustment end including a third segment inner diameter having a plurality of third segment inner threads engaging said second segment outer threads;

at least one third segment split sleeve passage formed in said third segment adjustment end to allow said third segment inner diameter to be reduced under said compression force; and a clamped sleeve portion formed as a portion of said third segment, said clamped sleeve portion including a clamp actuator, said clamp actuator applying said compression force to said second segment inner diameter and said third segment inner diameter to prevent rotational movement of said second segment.

2. An aircraft control surface actuator assembly as described in claim 1, wherein said second segment inner threads and said second segment outer threads are orientated such that rotational movement of said second segment moves said first segment and said third segment in opposite linear directions.

3. An aircraft control surface actuator assembly as described in claim 1, wherein said mechanical drive mechanism comprises:

a drive shaft in communication with said flight control surface; and at least one mechanical drive lever mounted to said drive shaft, said first control mounting end mounted to said at least one mechanical drive lever.

4. An aircraft control surface actuator assembly as described in claim 1, further comprising:

at least one secondary actuator rod assembly in communication with said mechanical drive mechanism.

5. An aircraft control surface actuator assembly as described in claim 1, wherein said first segment includes at least one first segment bolt passage positioned on said first control mounting end.

6. An aircraft control surface actuator assembly as described in claim 1, wherein said second segment includes a polygonal interface positioned on a first end of said second segment.

7. An aircraft control surface actuator assembly as described in claim 6, wherein said polygonal interface comprises a hexagonal interface.

8. An aircraft control surface actuator assembly as described in claim 1, wherein said at least one second segment split sleeve passage comprise three second segment split sleeve passages.

9. An aircraft control surface actuator assembly as described in claim 1, wherein said at least one third segment split sleeve passage positioned on said clamped sleeve portion.

10. An aircraft control surface actuator assembly as described in claim 1, wherein said clamp actuator comprises a nut-clamp assembly.

11. An aircraft control surface actuator assembly as described in claim 1, wherein said third segment further comprises:

at least one extension rod segment attached to said third segment adjustment end; and a third segment bolt passage mounted to said third segment mounting end.

12. An aircraft control surface actuator assembly comprising:

a flight control surface;

a mechanical drive mechanism in communication with said flight control surface, said mechanical drive mechanism controlling movement of said flight control surface;

a first actuator rod assembly mounted to said mechanical drive mechanism, said first actuator rod assembly comprising:

a first segment having a first control mounting end mounted to said mechanical drive mechanism and a first segment adjustment end, said first segment adjustment end including a first segment outer diameter comprising a plurality of first segment outer threads;

a second segment including a second segment inner diameter having a plurality of second segment inner threads and a second segment outer diameter having a plurality of second segment outer threads, said second segment inner threads engaging said first segment outer threads;

at least one second segment split sleeve passage formed in said second segment, said at least one second segment split sleeve passage allowing said second segment inner diameter to be reduced under a compression force;

a third segment including a third segment adjustment end and a third segment mounting end, said third section adjustment end including a third segment inner diameter having a plurality of third segment inner threads engaging said second segment outer threads;

at least one third segment split sleeve passage formed in said third segment adjustment end to allow said third segment inner diameter to be reduced under said compression force; and a clamp actuator applying said compression force to said second segment inner diameter and said third segment inner diameter to prevent rotational movement of said second segment; and a second actuator rod assembly mounted to said mechanical drive assembly.

13. An aircraft control surface actuator assembly as described in claim 12, wherein said second segment inner threads and said second segment outer threads are orientated such that rotational movement of said second segment moves said first segment and said third segment in opposite linear directions.

14. An aircraft control surface actuator assembly as described in claim 1, wherein said mechanical drive mechanism comprises:

a drive shaft in communication with said flight control surface; and at least one mechanical drive lever mounted to said drive shaft, said first control mounting end mounted to said at least one mechanical drive lever.

15. An aircraft control surface actuator assembly as described in claim 12, wherein said second segment includes a polygonal interface positioned on a first end of said second segment.

16. An aircraft control surface actuator assembly as described in claim 12, further comprising:

a clamped sleeve portion attached as a portion of said third segment, said at least one third segment split sleeve passage positioned on said clamped sleeve portion.

17. An aircraft control surface actuator assembly as described in claim 12, wherein said at least one second segment split sleeve passage comprises three second segment split sleeve passages.

18. An aircraft control surface actuator assembly as described in claim 12, wherein said clamp actuator comprises a nut-clamp assembly.

19. An aircraft control surface actuator assembly as described in claim 12, wherein said third segment further comprises:

at least one extension rod segment attached to said third segment adjustment end; and a third segment bolt passage mounted to said third segment mounting end.

20. An aircraft control surface actuator assembly as described in claim 19, wherein said at least one extension rod segment is mounted to said third segment adjustment end through the use of rivets.

* * * * *